E. LONG.
LOCK.
APPLICATION FILED APR. 5, 1921.

1,420,853.

Patented June 27, 1922.
3 SHEETS—SHEET 1.

Edward Long,
INVENTOR
BY Victor J. Evans
ATTORNEY

E. LONG.
LOCK.
APPLICATION FILED APR. 5, 1921.
1,420,853.
Patented June 27, 1922.
3 SHEETS—SHEET 2.
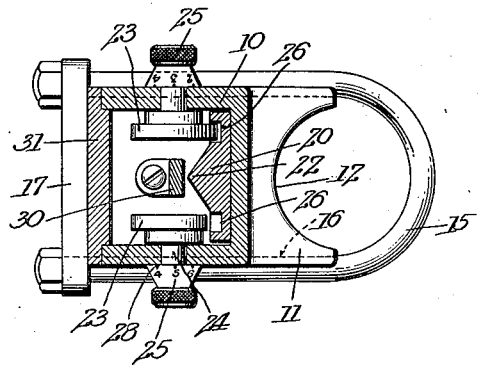
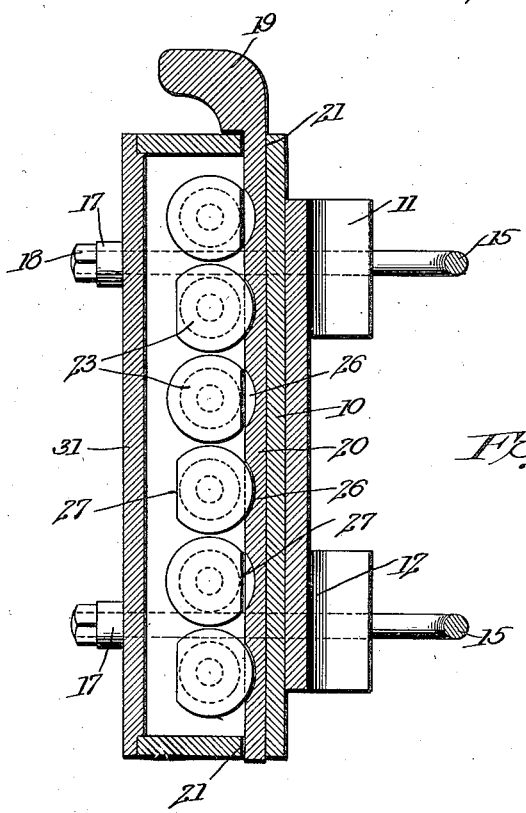
Edward Long,
INVENTOR
BY Victor J. Evans
ATTORNEY
WITNESS:

E. LONG.
LOCK.
APPLICATION FILED APR. 5, 1921.

1,420,853.

Patented June 27, 1922.
3 SHEETS—SHEET 3.

Edward Long,
INVENTOR
BY Victor J. Evans
ATTORNEY

WITNESS:

UNITED STATES PATENT OFFICE.

EDWARD LONG, OF BURKE, IDAHO.

LOCK.

1,420,853.  Specification of Letters Patent.  Patented June 27, 1922.

Application filed April 5, 1921. Serial No. 458,784.

*To all whom it may concern:*

Be it known that I, EDWARD LONG, a citizen of the United States, residing at Burke, in the county of Shoshone and State of Idaho, have invented new and useful Improvements in Locks, of which the following is a specification.

This invention relates to improvements in locks especially adapted for automobiles, an object of the invention being the provision of a lock which will prevent rotation of the steering wheel and thereby guard against the unauthorized use of the car.

Another object of the invention is the provision of a lock of this character which includes an abutment adapted to be placed between the spokes of the steering wheel to prevent steering the automobile, means being provided for locking the abutment in such position, or for locking it in position to permit of the use of the automobile.

Another object is the provision of means for securing the lock to the automobile in a manner to also prevent access to the working parts of the lock, so that the latter cannot be tampered with.

With the above and other objects in view, the invention further includes the following novel features and details of construction, to be hereinafter more fully described, illustrated in the accompanying drawings and pointed out in the appended claims.

In the drawings:—

Figure 3 is a transverse sectional view.

Figure 4 is a vertical section with certain of the disks engaged with the abutment carrying bolt, other of the disks being disengaged.

Figure 1:
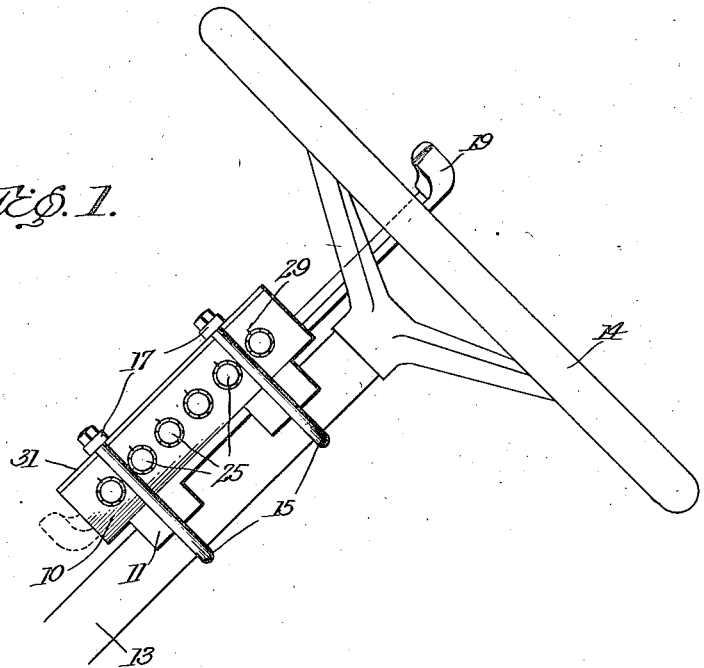
Figure 1 is a side elevation illustrating the use of the invention and showing by dotted lines the position of the abutment when the lock is not in use.
Figure 2:
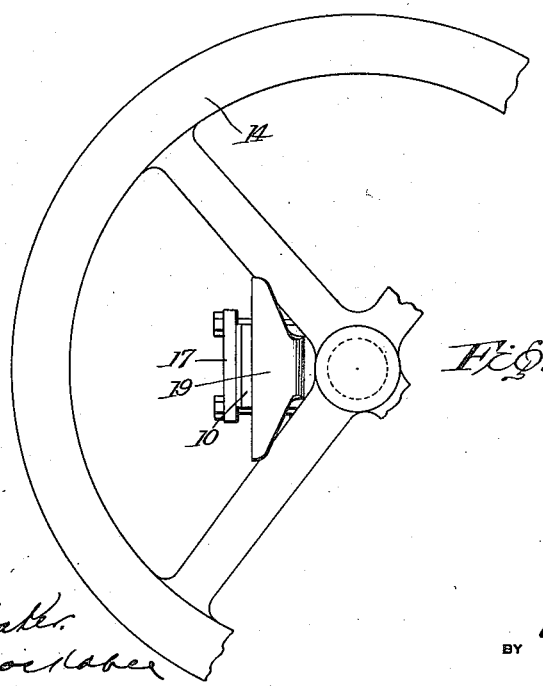
Figure 2 is a plan view of the same.
Figure 5:
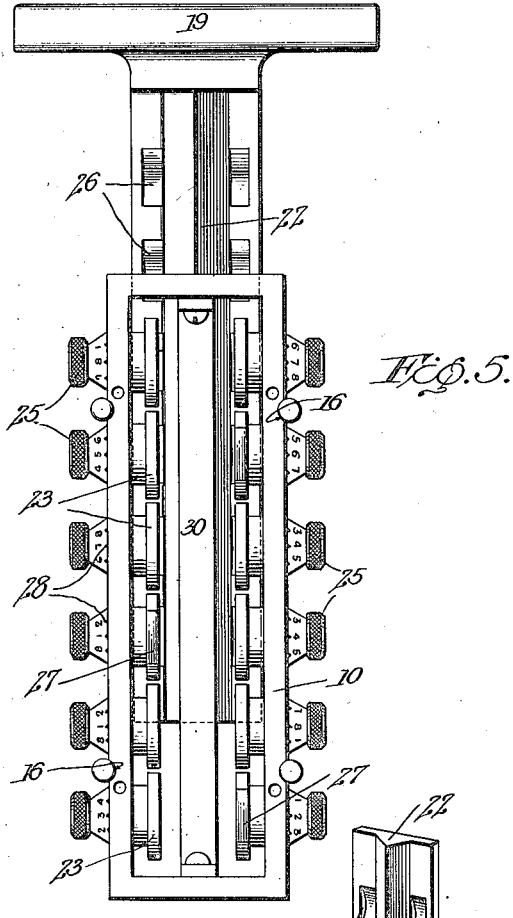
Figure 5 is a rear elevation of the lock with the casing closure removed and the bolt and abutment shown partly withdrawn.
Figure 6:
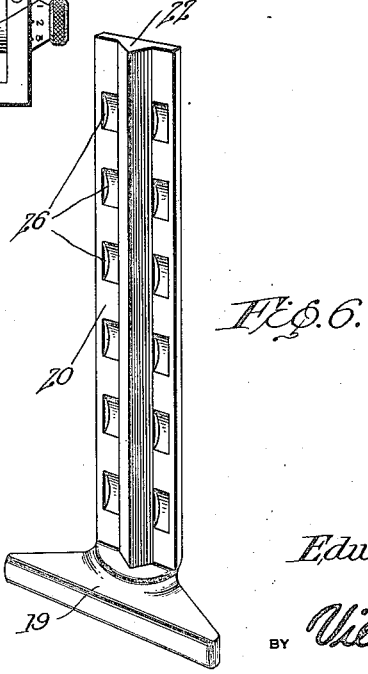
Figure 6 is a similar view of the bolt and abutment.

Referring in detail to the drawings, wherein like characters of reference denote corresponding parts, the reference character 10 indicates the lock casing, from one face of which extends lugs 11 having curved depressions 12 therein to provide saddles for engagement with the steering column 13 of an automobile. The lock is adapted to be positioned directly beneath the steering wheel 14 and is secured in position upon the column 13 through the medium of U-bolts 15. These bolts engage transversely disposed grooves 16 formed in the opposite sides of the casing 10 and their ends are engaged by clips 17, which are held in position by nuts 18. In order to permanently secure the lock in position, the threaded ends of the bolts 15 are upset so as to prevent the removal of the nuts.

The lock includes an abutment 19, which is of substantially triangular formation and is adapted to lie between spokes of the steering wheel 14 so as to prevent rotation of this wheel, the said abutment being carried at one end of a bolt 20, which is slidable within the casing. The abutment 19 is arranged substantially at right angles to the bolt 20 and the latter is received within openings 21 provided in the upper and lower ends of the lock casing, the bolt being preferably provided with a V-shaped rib 22 which extends longitudinally of the bolt, while the openings 21 are shaped in accordance with the transverse section of said bolt.

Rotatably mounted within opposite sides of the casing 10 are substantially circular disks 23 and extending from these disks through bearing openings provided in the casing are pintles 24, whose outer ends have secured thereon operating knobs 25, by means of which the disks may be rotated. The disks 23 are arranged in vertical alignment upon each side of the casing and are adapted to engage seats or depressions 26 formed adjacent each edge upon one face of the bolt 20 and when so engaged the bolt will be held against removal. To permit of the removal of the bolt, the disks 23 are formed with flattened portions 27, which, when arranged parallel with the face of the bolt 20 will permit of the withdrawal of the latter. In order to determine the position of the flattened portions 27 of the disks, the operating knobs 25 are provided with notches 28, the notches of each knob being provided with distinguishing numbers or characters and when certain of these notches are brought into register with an indicating mark 29 provided in the outside of the casing 10, the disks will be positioned to permit of the removal or insertion of the bolt 20. It is obvious that the numbers or characters upon the knobs may be so arranged as to provide a great number of different combinations, so that the combination of numbers required to operate each lock will be different. If desired, the casing may be strengthened by providing upon the inside thereof a brace 30.

One side of the casing is open and is provided with a closure plate 31, which is held in position by screws or other fastening devices and in order to permanently close the casing so that the mechanism of the lock cannot be tampered with after the latter has been secured in position, the clips 17 which engage the U-bolts 15 are arranged transversely across this plate 31. By this means the lock of the casing is permanently sealed when the lock is secured in place.

Normally, the bolt is inserted through the opening 21 in the bottom of the casing and held in position through the engagement of any one of the disks 23 with the seats or depressions 26. When it is desired to lock the steering wheel, the bolt is removed and inserted through the opening 21 in the top of the casing and the disks rotated to cause their engagement in the seats or depressions of the bolt. In this position the abutment 19 will prevent rotation of the steering wheel, due to its position in the path of the steering wheel spokes. To unlock the steering wheel the knobs 25 are operated to bring the proper numbers of the combination into position, whereupon the disks 23 will be disengaged and the removal of the bolt permitted.

The invention is susceptible of various changes in its form, proportions and minor details of construction and the right is herein reserved to make such changes as properly fall within the scope of the appended claims.

Having described the invention what is claimed is:—

1. An automobile lock embodying a casing, means whereby the casing may be secured to the column of the steering wheel, means removably carried by the casing for engagement with the steering wheel, whereby rotation of the latter may be prevented, means including a plurality of longitudinally aligned rotatable locking elements located within the casing and engageable with the steering wheel engaging means for locking the latter in position, each of said locking elements comprising a relatively small shank mounted for rotation in the casing, a circular disk carried by the inner end of the shank and spaced from the inner wall of the casing, a flat portion formed on the periphery of the disk, a tapered indicia carrying head located upon the opposite end of the shank upon the outside of the casing and a knurled operating knob extending from the head of each of the locking elements, whereby the disks may be rotated to lock or unlock said steering wheel engaging means.

2. An automobile lock embodying a casing, means whereby the casing may be secured to the column of the steering wheel, a bolt slidable within the casing, said bolt plate comprising an elongated substantially flat member, a longitudinally extending cross sectional triangular rib disposed centrally of the flat member and the latter having spaced depressions upon opposite sides of the rib, an abutment carried by the bolt for position between the spokes of the steering wheel to prevent rotation of the latter, rotatably mounted circular disks located within the casing for engagement within depressions formed in the bolt to hold the latter in position, flattened portions formed on said disks and means located upon the outside of the casing, whereby the disks may be rotated to engage or release the bolt.

3. An automobile lock embodying a casing open at one side and provided with a closure, means whereby the casing may be permanently secured to the column of the steering wheel, means whereby said securing means will prevent the removal of the casing closure, means removably carried by the casing for engagement with the steering wheel, whereby rotation of the latter may be prevented and means for locking the steering wheel engaging means in position.

In testimony whereof I affix my signature.

EDWARD LONG.